United States Patent Office 3,108,069
Patented Oct. 22, 1963

3,108,069
ETHYNYL COMPOUNDS FOR USE IN THE INHIBITION OF SILICATE SWELLING
Roger F. Monroe, Clare H. Kucera, and Korwin J. Goodwin, Tulsa, Okla., assignors to The Dow Chemical Company, Midland, Mich., a corporation of Delaware
No Drawing. Filed Jan. 26, 1961, Ser. No. 84,997
12 Claims. (Cl. 252—8.5)

The invention relates to a method of injecting water into a terranean formation comprising oil- or gas-bearing strata and one or more strata or drift material of an argillaceous nature adjacent to or interbedded with the oil- or gas-bearing strata. The invention encompasses any operation wherein water or an aqueous composition is injected into a terranean formation, e.g., drilling, treating and operating wells penetrating or traversing such formation.

Argillaceous material, such as clay, shale, and the like, in general, is hydratable, i.e., it swells or expands when contacted with water, an aqueous solution, slurry, suspension, or emulsion. Such swelling seriously impairs the permeability of the formation in which it occurs. In the production of oil and gas, it is often necessary or advisable to inject water or an aqueous solution into a subterranean formation. Water or aqueous solutions are frequently employed in the treatment of wells, e.g., fracturing and acidizing, and in the secondary recovery of oil or gas wherein a brine or water is pumped into one or more input wells and displaces the oil or gas in the formation toward one or more output wells.

Many attempts have been made to lessen the swelling of such hydratable argillaceous material in a formation when contacted by water or an aqueous solution, slurry, suspension, or emulsion. None of these attempts has thus far been fully satisfactory.

Therefore, the principal object of the instant invention is to provide an improved method of treating a fluid-bearing subterranean formation containing hydratable argillaceous material. The expression, treating, as used herein, includes injecting water or aqueous solutions suspension or the like into a formation in a unit operation for the purpose of providing aqueous drive or water-flooding to force desirable fluids toward an output well, e.g., in secondary recovery production.

How this object and other related objects are attained is made clear in the ensuing description and is specifically defined in the appended claims.

The invention, accordingly, is an improved well treating composition and the method of use thereof in drilling, acidizing, fracturing, and the like, and in water flooding production operations, any or all of which are sometimes referred to hereinafter as working a well. The composition is an aqueous solution comprising the reaction product or complex of sodium hydroxide and an ethynyl-substituted naphthenic mono-alcohol employed in an amount of at least 0.025 and preferably at least 0.05 percent by weight of the aqueous composition. Naphthenic means that the alcohol contains the naphthene ring. The aqueous solution may be either neutral, basic, or acidic. For use in acidic compositions the procedural steps employed in the preparation of the sodium hydroxide, ethynyl-substituted naphthenic composition preferably include admixing the NaOH in water and the ethynyl-substituted naphthenic mono-alcohol in an organic solvent, subsequently intermixing the two solutions, and recovering the complex by filtration, as more fully explained hereinafter.

Illustrative of the ethynyl-substituted naphthenic mono-alcohols suitable for use in preparing the NaOH complex thereof, used in the practice of the invention, are: 1-ethynylcyclohexanol, 1-ethynyl(p-tertiary) cyclohexanol, 1-ethynyl-x-methylcyclohexanol, 1-ethynylcyclopentanol, 2-(1-ethynylcyclohexyloxy)ethanol, 1-(1-ethynylcyclohexyloxy)-2-propanol, and 1-(1-ethynylcyclohexyloxy)ethanol.

When the aqueous treating composition of the invention has a pH value of 7 or more, the sodium hydroxide complex of the ethynyl-substituted naphthenic monoalcohol may be prepared in situ by admixing an ethynyl-substituted naphthenic alcohol and sodium hydroxide in suitable proportions in the aqueous treating composition. If preferred, the NaOH, either as a paste or flake, but preferably as an aqueous solution of between about 5 and 50 percent by weight, may be previously intermixed to yield the resulting complex which is then admixed with the aqueous treating fluid.

When the aqueous treating composition of the invention, employing the NaOH complex in accordance with the invention, has a pH value of less than 7, i.e., is acidic, the complex is prepared by admixing the ethynyl-substituted naphthenic alcohol in a suitable organic solvent, e.g., benzene or toluene. Sodium hydroxide is admixed with another portion of water in a separate container to prepare a sodium hydroxide solution thereof. Thereafter the organic solution containing the ethynyl-substituted naphthenic alcohol and the aqueous solution of sodium hydroxide are intermixed. A white precipitate is formed. The white precipitate, which is of a flocculent nature and forms immediately, is separated from the supernatant liquid by any known means, usually by filtration. It is then air-dried. The product thus recovered is the sodium hydroxide complex of the ethynyl-substituted naphthenic alcohol employed in the practice of the invention. It may be readily admixed with any aqueous well drilling or well-treating composition or in water or aqueous compositions employed in water-flood operations in the production of oil or gas whether such aqueous compositions are acidic, neutral, or basic.

The proportions of NaOH and the ethynyl naphthenic alcohol, on a molar basis, employed in the preparation of the additament to be subsequently admixed with an aqueous well drilling or treating composition, are usually between about 1 mole of ethynyl-substituted naphthenic alcohol and between about 1 and 5 moles of the sodium hydroxide. Common proportions to employ are about 1 mole of the ethynyl-substituted naphthenic alcohol and between about 1.25 and 2 moles of sodium hydroxide dissolved in sufficient water to make about a 30 percent caustic solution. In other words a slight excess of NaOH over the 1:1 mole ratio is recommended. On the other hand a greater excess of NaOH, aside from the economic aspects, appears harmless.

A series of runs consisting of the tests set forth below was made to illustrate the practice of the invention employing non-acidic aqueous compositions. Samples of the Mesa Verde formations of New Mexico which consists of about 90 percent limestone interbedded with about 10 percent argillaceous material, intermixed with 5 percent Wyoming bentonite, were used in this series of tests. 1 gram of each sample was weighed out and placed in 100 milliliters of kerosene. The volume of the sample in kerosene was carefully measured as a fraction of a milliliter. Thereafter 1 gram of each sample was weighed out and placed in 100 milliliters of each of the aqueous treating composition set out in Table I. All compositions contained the NaOH ethynyl-substituted alcohol complex, except those tests which were run for comparative purposes. The samples were contained in a pear-shaped centrifuge tube of the type employed in A.S.T.M. Test D96–52T described on pages 48–50 of A.S.T.M. Standards 1952, Part 5. The sample, comprising argillaceous material, settled to the bottom of the tube. After about 5 minutes the tube was shaken to insure wetting of all the sample, and then allowed to stand for 16 hours under atmospheric conditions to allow time for swelling. At the end of that time, the pear-shaped tube containing the sample was placed in the centrifuge apparatus described in said A.S.T.M. test and centrifuged at 1000 r.p.m. for 1 minute. The tube was then removed and the volume of packed argillaceous material in the bottom of the tube was measured. To simplify evaluation of results, the volume occupied by each of the samples in kerosene was arbitrarily set at 1. The volume in each of the aqueous compositions was then compared to 1 in kerosene. For example, if the volume of the argillaceous material in kerosene was 0.98 ml. and an aqueous composition it was 1.21 ml., then the swelled volume in the aqueous composition, based on a volume of 1 in kerosene, would be $$\frac{1.21}{0.98}$$

or 1.24 volume units in the aqueous composition.

Table I

| Test No. | Percent by Weight of Aqueous Solution, of Sodium Hydroxide-Ethynyl Alcohol Complex Added | Relative Volume [1] of Argillaceous Material in Water, Except Test 1 |
|---|---|---|
| 1 | None | [2]1.00 |
| 2 | None | 2.00 |
| 3 | 0.5 1-ethynyl (p-tert.-butyl) cyclohexanol | 1.16 |
| 4 | 0.1 1-ethynyl (p-tert.-butyl) cyclohexanol | 1.00 |
| 5 | 0.05 1-ethynyl (p-tert.-butyl) cyclohexanol | 1.00 |
| 6 | 0.5 1-ethynyl-x-methylcyclohexanol | 1.15 |
| 7 | 0.1 1-ethynyl-x-methylcyclohexanol | 1.00 |
| 8 | 0.05 1-ethynyl-x-methylcyclohexanol | 1.00 |
| 9 | 0.5 1-ethynylcyclopentane-1-ol | 1.15 |
| 10 | 0.1 1-ethynylcyclopentane-1-ol | 1.00 |
| 11 | 0.05 1-ethynylcyclopentane-1-ol | 1.00 |
| 12 | 0.5 1-ethynylcyclohexanol | 1.15 |
| 13 | 0.1 1-ethynylcyclohexanol | 1.00 |
| 14 | 0.05 1-ethynylcyclohexanol | 1.00 |
| 15 | 0.025 1-ethynylcyclohexanol | 1.00 |
| 16 | 0.01 1-ethynylcyclohexanol | 1.05 |
| 17 | 0.005 1-ethynylcyclohexanol | 1.12 |
| 18 | 0.0025 1-ethynylcyclohexanol | 1.90 |

[1] The relative volumes are based upon the volume of the argillaceous material in kerosene as 1.
[2] In kerosene.

Reference to Table I shows that when the sodium hydroxide, ethynyl-substituted naphthenic alcohol complex was employed in an amount as little as 0.025 percent (250 parts per million), the swelling of the argillaceous material, when brought in contact with water, was the same or substantially the same volume as was obtained when the argillaceous material was dispersed in kerosene. Amounts of between 0.05 and 0.1 percent, based on the weight of the aqueous solution, appear preferable for the various sodium hydroxide, ethynyl-substituted naphthenic alcohol complexes to employ.

A second series of test was run to show the effectiveness of the presence of the NaOH ethynyl-substituted naphthenic alcohol in an aqueous acidic medium on additional samples of the same argillaceous material employed in the tests set out in Table I.

For showing the effectiveness of the invention when employing an acidic aqueous composition, the procedure set out below was followed:

124 grams (1 mole) of 1-ethynylcyclohexanol or 1-ethynylcyclopentanol were dissolved in 476 grams of benzene as an organic solvent. In a separate container 80 grams (2 moles) of sodium hydroxide were dissolved in 186.7 grams of water, making a total weight of 266.7 grams of a 30 percent aqueous sodium hydroxide solution. The organic solution of the ethynylcyclonaphthenic alcohol and the aqueous solution of the sodium hydroxide were then mixed together to produce the white flocculent precipitate described above. The precipitate was separated by filtration and air dried to yield 168 grams of the sodium hydroxide complex of 1-ethynylcyclonapthenic alcohol.

For showing the effectiveness of the practice of the invention, when employing an acidic aqueous composition the acid therein was first spent, i.e., substantially neutralized because the swelling of argillaceous material in an acidic medium is not a problem. The reason that swelling is not a problem is that the hydrogen ions, due to the presence of the acid, convert silicates of alkali metal and alkaline earth metals, comprising the argillaceous material, to hydrogen silicates. The molecules of the hydrogen silicates so formed are of less volume than those containing such larger atoms as calcium or sodium. Therefore, swelling of an argillaceous material in an acidized reservoir is not a problem until the acid becomes spent.

Therefore, in this series of tests, wherein the aqueous composition was acidic, a sufficient amount of limestone was added to the acidic composition to react with the acid present, thereby to simulate acid treatment of a limestone formation containing argillaceous material interbedded therein.

Accordingly, in the tests of this series wherein an aqueous acidic composition was employed, the procedure for showing effectiveness was as follows: 15 milliliters of a 15 percent by weight hydrochloric acid was placed in a 100 milliliter beaker. The ethynyl-substituted naphthenic alcohol, when employed, was then added thereto. Thereafter, there were slowly added to the beaker 3.34 grams of calcium carbonate and 1 gram of the argillaceous material of the type employed in the series of tests set out in Table I. After the acid had spent, the contents of the beaker were transferred to the 100 milliliter pear-shaped centrifuge tube and diluted to the 50 milliliter mark with water. The mixture was allowed to stand for 16 hours and then centrifuged for 1 minute at 1000 r.p.m. The volume of the packed solids in the bottom of the centrifuge tube was then measured. The results of the tests were evaluated, as in the above series set out in Table I, by proportionating the volume of the argillaceous material in kerosene to 1 unit volume and comparing the swollen volume of the argillaceous material in the aqueous compositions to that in kerosene when taken as 1 unit. The results of the second series of tests are set out in Table II below. The swelling of the argillaceous material in kerosene and water are repeated from Table I for convenient reference.

Table II

| Test No. | Percent by Weight of NaOH—Ethynyl Complex Added | Relative Volume [1] of Argillaceous Material After Contact with the Aqueous Acidic Composition, Except Test #1 |
|---|---|---|
| 1 (Repeated from Table I) | None | 1.00 (in kerosene) |
| 2 (Repeated from Table I) | None | 2.00 |
| 19 | 0.025 NaOH complexed with 1-ethynylcyclohexanol | 1.37 |
| 20 | 0.10 NaOH complexed with 1-ethynylcyclohexanol | 1.11 |
| 21 | 0.50 NaOH complexed with 1-ethynylcyclohexanol | 1.11 |
| 22 | 0.05 NaOH complexed with 1-ethynylcyclopentanol | 1.25 |

[1] The relative volumes are based upon the volume of the argillaceous material in kerosene as 1.

Reference to Table II shows that any of argillaceous material was clearly inhibited in the swelling, if any occurred, due to contact with an aqueous acidic composition containing the sodium hydroxide, 1-ethynylcyclohexanol or the sodium hydroxide, 1-ethynylcyclopentanol complex admixed with the aqueous acidic solution containing hydrochloric acid. The swelling effect was measured, as above described, after the acid had spent itself on limestone.

The practice of the invention has obvious advantages where drilling, water-flooding, or treating operations are carried on in the production of oil or gas from formations containing argillaceous material.

Having described our invention, what we claim and desire to protect by Letters Patent is:

1. An aqueous composition to lessen the swelling of argillaceous material when contacted with water for use in water-flooding of oil- and gas-producing formations, in well drilling, and in the treatment of formations containing such material which comprises as an essential ingredient at least about 0.025 percent, based on the weight of said composition, of the reaction product of sodium hydroxide and an alcohol selected from the class consisting of 1-ethynyl-1-cycloalkanols and 1-ethynyl-1-cycloalkyloxyalkanols, said reaction product being prepared by admixing sodium hydroxide and said alcohol in an aqueous medium in amounts sufficient to provide between 1 and 5 moles of sodium hydroxide per mole of said alcohol.

2. The composition of claim 1 wherein said alcohol is 1-ethynylcyclopentanol.

3. The composition of claim 1 wherein said alcohol is 1-ethynylcyclohexanol.

4. The composition of claim 1 wherein said alcohol is 1-ethynyl(p-tertiary-butyl)cyclohexanol.

5. The composition of claim 1 wherein said alcohol is 1-ethynyl-x-methylcyclohexanol.

6. The composition of claim 1 wherein said alcohol is 1-(1-ethynylcyclohexaloxy)-2-propanol.

7. The composition of claim 1 wherein said alcohol is 1-(1-ethynylcyclohexaloxy)ethanol.

8. The method of treating and operating a well penetrating a formation containing argillaceous material comprising the essential step of injecting into said formation the composition of claim 1.

9. The composition of claim 1 wherein the sodium hydroxide and said alcohol reaction product is present in an amount of at least 0.05 percent by weight of said composition.

10. The method of treating and operating a well penetrating a formation containing argillaceous material comprising the essential step of injecting into said formation the composition of claim 9.

11. An aqueous composition to lessen the swelling of argillaceous material when contacted with water for use in water-flooding oil- and gas-producing operations, in well drilling, and in the treatment of formations containing such material which comprises as an essential ingredient the reaction product of sodium hydroxide and an alcohol selected from the class consisting of 1-ethynyl-1-cycloalkanols and 1-ethynyl-1-cycloalkyloxyalkanols prepared by admixing said alcohol with an organic solvent inert to said alcohol and immiscible with water, admixing sodium hydroxide with a separate portion of water in a separate container, and thereafter intermixing the so made organic solution and the aqueous solution, to provide a molar ratio of between 1 and 5 moles of sodium hydroxide per mole of said alcohol, to form a flocculant precipitate, separating the precipitate thus formed, air-drying the precipitate to produce said reaction product, and admixing reaction product thus formed with an aqueous composition useful in working a well in an amount of at least 0.025 percent by weight of said aqueous composition.

12. The method of treating and operating a well penetrating a formation containing argillaceous material comprising the essential step of injecting into said formation the composition of claim 11.

References Cited in the file of this patent
UNITED STATES PATENTS

| | | |
|---|---|---|
| 2,761,838 | Brown et al. | Sept. 4, 1956 |
| 2,913,408 | Pumpelly et al. | Nov. 17, 1959 |
| 2,957,823 | Newcombe et al. | Oct. 25, 1960 |
| 2,986,569 | Monroe et al. | May 30, 1961 |
| 2,989,567 | Leeds et al. | June 20, 1961 |
| 2,993,864 | Monroe et al. | July 25, 1961 |